United States Patent [19]

Blidüng et al.

[11] 4,161,094
[45] Jul. 17, 1979

[54] APPARATUS FOR PROCESSING BISCUITS OR THE LIKE

[75] Inventors: Otto Blidüng, Geesthacht; Gerhard Tolasch, Wentorf; Dietrich Bardenhagen, Hamburg, all of Fed. Rep. of Germany

[73] Assignee: Hauni-Werke Körber & Co. KG., Hamburg, Fed. Rep. of Germany

[21] Appl. No.: 881,822

[22] Filed: Feb. 27, 1978

[30] Foreign Application Priority Data

Mar. 16, 1977 [GB] United Kingdom ............... 11043/77
Jan. 7, 1978 [DE] Fed. Rep. of Germany ....... 2800570

[51] Int. Cl.$^2$ ............................................. B65B 57/00
[52] U.S. Cl. ....................................... 53/493; 53/202; 198/358; 198/444
[58] Field of Search ................... 53/493, 202; 198/358, 198/437, 444, 458

[56] References Cited

U.S. PATENT DOCUMENTS

| | | | |
|---|---|---|---|
| 2,412,137 | 12/1946 | Fink .................................. | 198/358 X |
| 2,819,786 | 1/1958 | Walters ............................. | 198/437 X |
| 3,774,748 | 11/1973 | Dederer et al. ..................... | 198/444 |
| 3,987,888 | 10/1976 | Wickam ............................. | 198/437 |

*Primary Examiner*—John Sipos
*Attorney, Agent, or Firm*—Peter K. Kontler

[57] ABSTRACT

Apparatus for treating biscuits which are discharged from an oven in the form of several rows has a discrete conveyor system for each row of biscuits. The biscuits of each row are converted into blocks each consisting of several arrayed biscuits, and such blocks are confined in wrapping material on their way to variable-output packing machines, one at the discharge end of each conveyor system, and each provided with turrets which convert blanks into containers for one or more wrapped blocks of biscuits and fill the containers. If a packing machine breaks down, the blocks on or in the respective conveyor system are transferred onto or into the other conveyor systems, and the output of packing machines at the discharge ends of the other conveyor systems is increased. Facilities are provided for temporary storage of blocks when the rate at which one or more conveyor systems deliver blocks to the respective packing machines exceeds the capacity of such machines. The storage facilities are filled prior to transfer of blocks from that conveyor system whose discharge end is adjacent to an idle packing machine. The contents of storage facilities are returned onto the respective conveyor systems as soon as the temporarily arrested packing machine is restarted.

26 Claims, 10 Drawing Figures

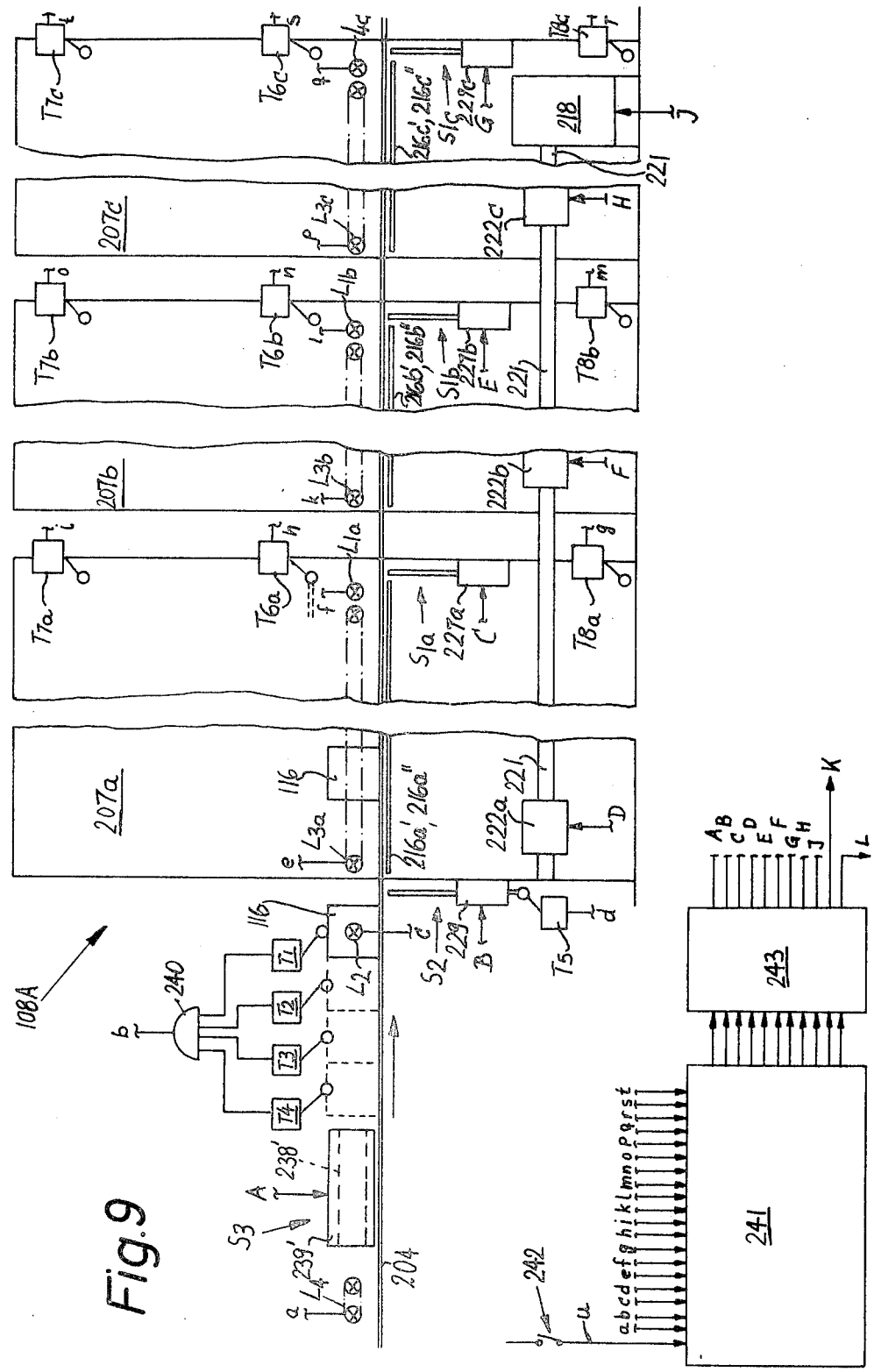

APPARATUS FOR PROCESSING BISCUITS OR THE LIKE

BACKGROUND OF THE INVENTION

The present invention relates to apparatus for processing wafers, crackers, saltines, pretzels, zwieback and other types of bakery products (hereinafter called biscuits) which are baked, dried or otherwise treated in an oven prior to further processing, especially packing. More particularly, the invention relates to improvements in apparatus for processing large quantities of biscuits between an oven and a means for confining biscuits in boxes, bags, packets or analogous containers. Still more particularly, the invention relates to apparatus for processing biscuits which issue, in large quantities, from an oven along two or more paths.

An oven for mass-production or treatment of biscuits is a bulky elongated aggregate which cannot be readily arrested and restarted. Thus, if the oven is directly coupled with a packing machine and the packing machine is arrested due to malfunction or for other reasons, the delivery of dough to the oven can be interrupted without delay; however, the contents of the oven must be processed so that the oven invariably discharges large quantities of biscuits subsequent to interruption of the admission of dough and while the packing machine is already idle. As a rule, the path between the outlet of the oven and the packing machine is observed by several attendants who must remove discrete biscuits or blocks of stacked biscuits (such blocks are normally provided with one or more wrappers of metallic foil, wax paper or the like) from the path along which the biscuits advance toward the idle packing machine. When the packing machine is restarted, the attendants shift the blocks of biscuits in the path to provide room for reinsertion of previously removed blocks and to thus avoid waste as well as to insure that the accumulations of removed blocks disappear prior to renewed deactivation of the packing machine.

As a rule, the packing machine is much more likely to be arrested than the oven and/or the devices which transport biscuits from the oven to the packing machine. The packing machine is designed to accept the entire output of a large oven, i.e., to confine in containers all such biscuits which issue from the oven and advance along several discrete paths each of which leads to the packing machine. The speed at which the biscuits issue from the oven is high so that the attendants must act quickly in order to insure removal of all biscuits or blocks of biscuits which issue from the oven subsequent to stoppage of the packing machine. This invariably entails damage to or destruction of a high percentage of biscuits. Furthermore, the cost of operation is very high because a number of attendants must be present at all times, regardless of whether or not the packing machine is running since they must be ready to proceed with removal of biscuits as soon as the speed of the packing machine is reduced or the packing machine comes to a full stop. Total deactivation of the entire apparatus (including the oven) is impractical because this would entail extremely high losses in output for obvious reasons, i.e., starting of a large industrial biscuit baking oven is a time-consuming procedure and large quantities of biscuits are wasted before the oven is again ready for normal operation. Therefore, the efficiency and reliability of the packing machine are those factors which exert maximum influence upon the output of the entire apparatus.

OBJECTS AND SUMMARY OF THE INVENTION

An object of the invention is to provide an apparatus which can process biscuits or the like with a minimum of waste.

Another object of the invention is to provide an apparatus which can automatically prorate those products which would go to waste in the event of partial breakdown of processing machinery, especially packing machines, so that the operation of the apparatus requires a minimum of supervision by attendants or no supervision at all.

A further object of the invention is to provide the apparatus with novel and improved means for rationing of the products which happen to be on their way to a processing machine which is out of commission or operates at a fraction of its normal capacity.

An additional object of the invention is to provide an apparatus whose output is high but which is capable of treating the products gently so that the products are not likely to crack, chip, break, undergo deformation and/or otherwise unfavorably alter their shape, size and/or consistency.

Still another object of the invention is to provide the apparatus with novel and improved facilities for temporary storage of biscuits or the like.

A further object of the invention is to provide a novel and improved control system which regulates the operation of processing machines, prorating unit and other units in the above outlined apparatus.

An additional object of the invention is to provide a novel and improved method of manipulating biscuits on their way from a large-capacity oven to one or more packing machines.

Another object of the invention is to provide novel and improved magazines for temporary storage of biscuits or the like and novel and improved means for transferring biscuits into or for removing biscuits from the magazines.

A further object of the invention is to provide an apparatus which is relatively simple, compact and reliable in spite of the fact that it can process huge quantities of biscuits or the like per unit of time.

The improved apparatus serves for the processing of biscuits which issue from an oven and comprises (a) a plurality of conveyor means for transporting discrete rows of biscuits from the oven along a plurality of separate paths, (b) means for accumulating the biscuits into a series of blocks in a first portion of each path (such accumulating means can include stackers which assemble columns of biscuits and pushers for expelling successive blocks of biscuits from the stackers), (c) a plurality of variable-output packing machines, one for each of the accumulating means, each disposed in a second portion of the respective path (normally at the discharge end of the respective conveyor means) and each comprising means for confining blocks of the respective series in containers (e.g., in cardboard boxes which are obtained on conversion of suitable blanks fed to or stored in the packing machine) each of which can receive one, two or more blocks, (d) means for prorating the blocks of the aforementioned series in third portions of the paths intermediate the first and second portions, including means for transferring blocks from one of the paths into the other paths in response to a reduction of the output (including stoppage) of the packing machine in the second portion of the one path, and (e) control means (e.g., a control system including a computer) having means for increasing the outputs of packing machines in the second portions of the other paths in response to transfer of blocks from the one path into the other paths.

The output of each packing machine can be varied independently of the other packing machine or machines. The presently preferred number of paths is three.

The apparatus preferably further comprises discrete wrapping means disposed in a fourth portion of each path intermediate the respective first and third portions. Each wrapping means can include devices for applying envelopes (e.g., wrappers consisting of wax paper, metallic foil or the like) to successive blocks in the respective path.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 9 is a diagrammatic view of the storing unit of FIG. 5 and of control means for the packing machines, storing units and prorating means in the apparatus of FIG. 1; and FIG. 10 is a diagrammatic plan view of modified prorating means.

DESCRIPTION OF THE PREFERRED EMBODIMENTS

Figure 1:
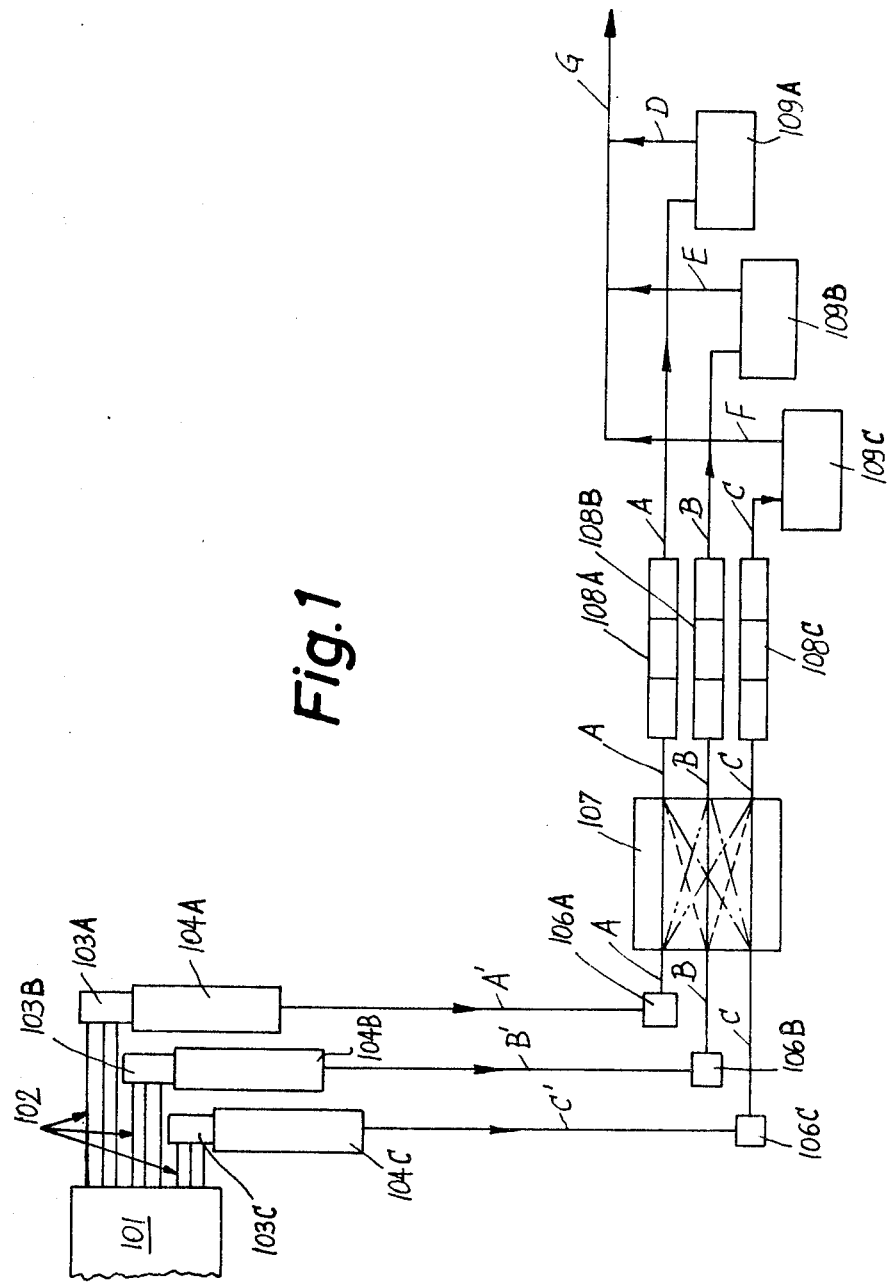
FIG. 1 is a schematic plan view of an apparatus which embodies the invention.
Figure 2:
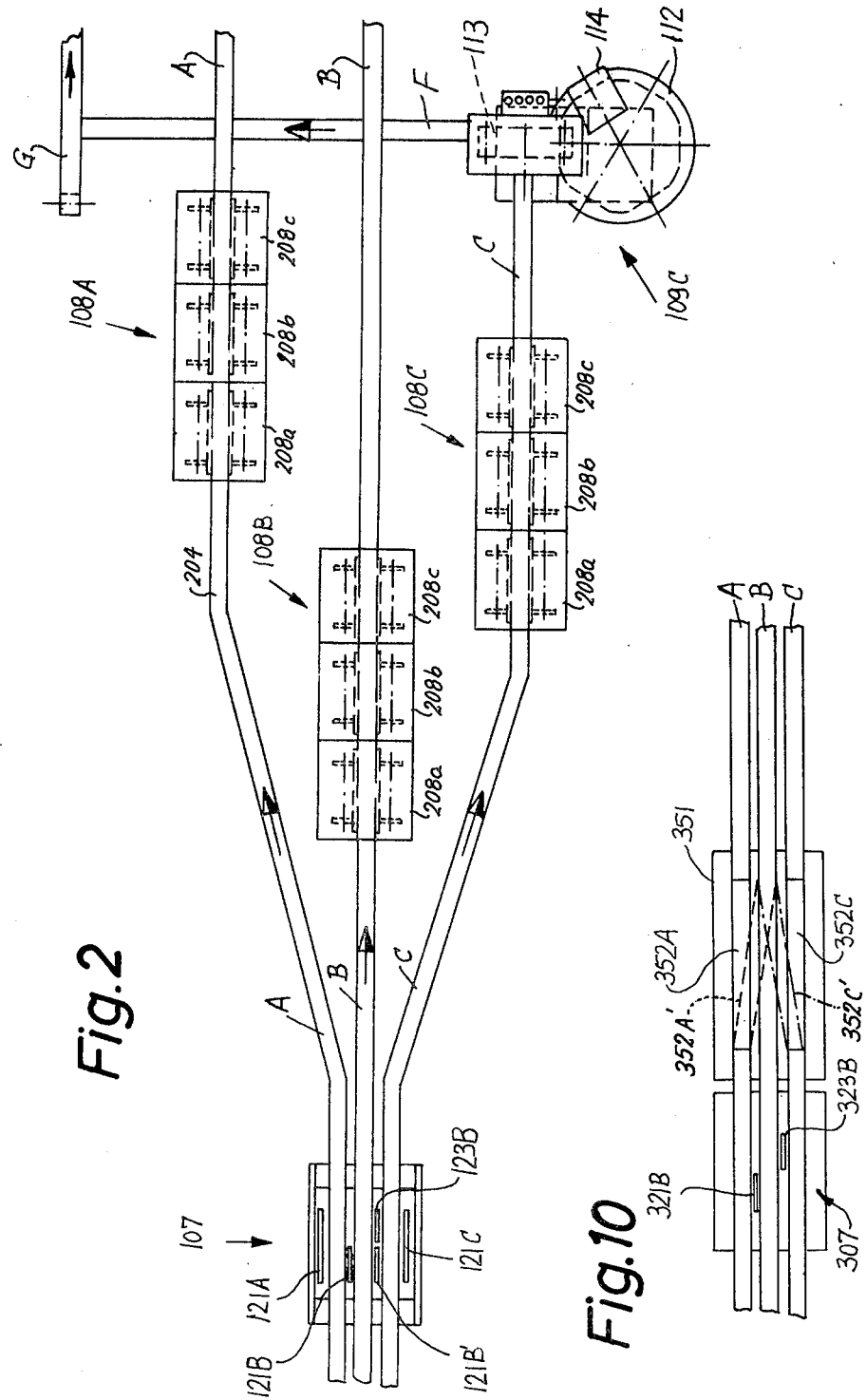
FIG. 2 is an enlarged view of a detail in FIG. 1.

Referring to FIGS. 1 and 2, there is shown an apparatus which processes biscuits issuing from an oven 101 along several paths defined by conveyor groups 102. Each conveyor group 102 delivers a row of discrete biscuits to one of three accumulating units 103A, 103B, 103C. Though not specifically shown in FIG. 1, each conveyor group 102 consists of several successive belt or chain conveyors which are driven at different speeds, namely, the speed of each preceding conveyor exceeds the speed of the next-following conveyor. This results in conversion of the respective row of biscuits from a single layer (wherein the biscuits are located in a common plane, one behind the other) into a shingle stream of partially overlapping biscuits and thereupon into a continuous moving horizontal column of upright biscuits which are located in vertical or nearly vertical planes. In other words, each conveyor group 102 treats the respective row of biscuits in a manner which is analogous to that of placing a row of playing cards onto a table so that the cards are disposed one behind the other, shortening the thus obtained row by causing the cards to partially overlap each other (shingle stream), and by thereupon gradually lifting successive cards of the shingle stream from a horizontal into a vertical plane whereby the extent to which a preceding card of the shingle stream is lifted slightly exceeds the extent of lifting of the next-following card until all of the cards form a deck of closely adjacent vertical cards.

The accumulating units 103A, 103B, 103C comprise upright ducts which receive successive biscuits of the respective horizontal columns and wherein such horizontal columns are converted into vertical columns consisting of parallel horizontal biscuits. The units 103A–103C further comprise means for withdrawing or expelling successive biscuits or predetermined numbers of biscuits from the lower end portions of the respective ducts so that each vertical column is converted into a row of discrete arrays each consisting of a predetermined number of parallel horizontal superimposed biscuits. The means for transferring such arrays (unwrapped blocks of biscuits) from the ducts of the accumulating units 103A–103C may comprise reciprocable pushers which advance the arrays downwardly, as viewed in FIG. 1.

The arrays which respectively issue from the accumulating units 103A, 103B, 103C are introduced into discrete wrapping or prepacking units 104A, 104B, 104C each of which comprises means (not specifically shown) for providing successive arrays with one or more envelopes or wrappers consisting of wax paper, metallic foil or other suitable wrapping material. The thus obtained wrapped blocks 116, shown in FIGS. 3–9 and hereinafter called blocks for short, are thereupon transported along discrete paths A', B' and C' to discrete orientation changing devices 106A, 106B, 106C which change the direction of movement of the blocks 116, e.g., by 90 degrees so that the blocks respectively begin to advance along the paths A, B and C. The paths A', B', C' are defined by a first set of continuously driven conveyors, and the paths A, B, C are defined by a second set of continuously driven conveyors. The orientation changing devices 106A, 106B, 106C comprise suitable stops which arrest the oncoming blocks 116 and suitable pushers which transfer the arrested blocks from the conveyors defining the paths A'–C' onto the conveyors defining the paths A–C.

The blocks 116 which advance along the paths A, B and C pass through a prorating or distributing unit 107 which influences the movements of blocks only under certain circumstances to be outlined hereinafter. As a rule, the blocks 116 which advance along the paths A, B and C simply travel through the prorating unit 107 and thereupon through discrete storing units 108A, 108B, 108C on their way to discrete variable-output packing machines 109A, 109B, 109C. Each packing machine comprises means for converting cardboard blanks or other types of blanks into containers (e.g., boxes, cartons or the like) for storage and confinement of n blocks 116 (n is a whole number including one). For example, each container which is formed in a packing machine can receive three aligned blocks 116. Closed containers (each confining n blocks 116) are thereupon discharged from the packing machines 109A, 109B, 109C to respectively advance along the paths D, E and F into a further path G for transport of containers to storage, to a baling unit or to a unit wherein the containers are introduced into larger containers for shipment to distributors or retailers. The paths D, E, F and G are also defined by suitable conveyors, e.g., endless belt or chain conveyors similar to the conveyor 204 shown in FIGS. 5 to 8. The conveyor 204 defines one of the paths A, B, C.

The purpose of the prorating unit 107 is to transfer blocks 116 from their respective paths (A, B, C) into other paths (e.g., from the path A into the paths B and C or from the path B into the paths A and C) in the event of stoppage of the packing machine 109A, 109B or 109C. Thus, and assuming that the packing machine 109A is arrested due to a malfunction or for any other reason, the prorating unit 107 becomes active and transfers all blocks 116 which arrive along the path A into the paths B and C to thereby avoid undue accumulations of blocks in the path A immediately ahead of the arrested packing machine 109A. At the same time, the output of the packing machines 109B and 109C is increased so that these machines can process the blocks 116 which arrive along the paths B', B and C', C as well as those blocks which are transferred from the path A into the paths B and C. If the output of the packing machines cannot be increased by 50 percent (so that each of the packing machines 109B, 109C could process all blocks which respectively arrive along the paths B', C' as well as one-half of the blocks 116 arriving along the path A'), the storing unit 108A, 108B and/or 108C is actuated to accept the surplus of blocks 116. For example, and assuming that the output of each packing machine can be increased by 20 percent above the normal output (100 percent), 60 percent of blocks 116 which arrive along the path A' must be introduced into one or more storing units 108A–108C in order to avoid overfilling of the paths B and C upstream of the packing machines 109B and 109C. In the illustrated embodiment, each storing unit comprises three discrete magazines (see the magazines 207a, 207b, 207c of the storing unit 108A in FIG. 5).

If a packing machine (e.g., the machine 109A) remains idle for a relatively long interval of time so that the transfer of 40 percent of wrapped blocks 116 from the path A into the paths B and C (while the packing machines 109B, 109C are driven at 20 percent above normal operating speed) does not suffice to process all of the blocks 116 which arrive along the path A', and if one of the storing units (e.g., the storing unit 108A) is already filled to capacity, the prorating unit 107 activates another storing unit (e.g., 108B) and, if necessary, the last storing unit (108C) before the packing machines 109B, 109C are arrested or before the surplus of blocks 116 arriving along the paths A' and A is removed by hand. All important details of one of the storing units (108A) are shown in and will be described with reference to FIGS. 5 to 9.

Figure 5:
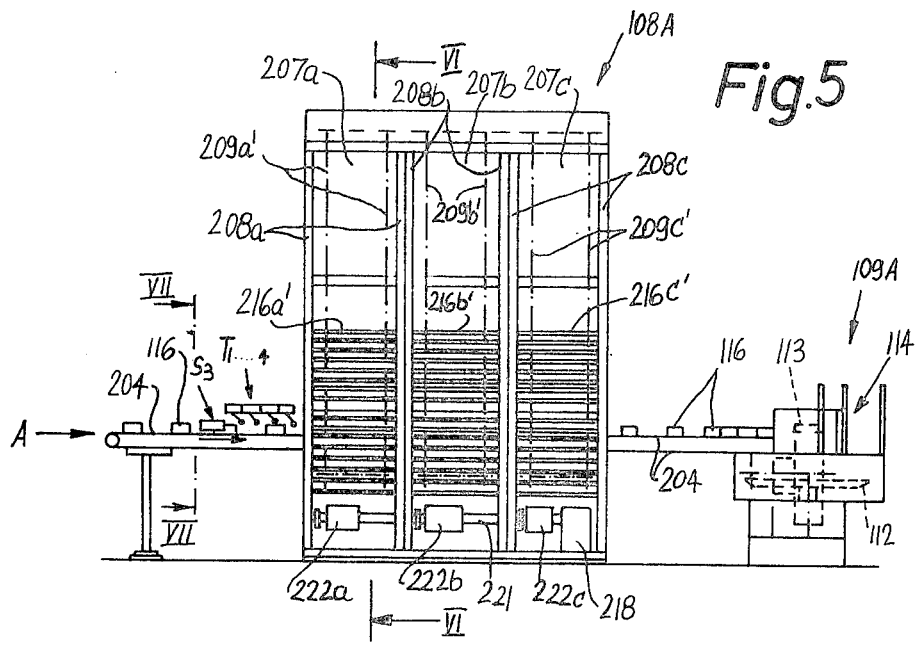
FIG. 5 is a schematic side elevational view of a storing unit in the apparatus of FIG. 1.

FIGS. 2 and 5 respectively show certain components of the packing machines 109C and 109A. Each packing machine comprises two turrets 112 and 113 which rotate about axes making an angle of 90 degrees and cooperating with suitable folding, tucking and other blank deforming devices (not specifically shown) to convert blanks (stored in a hopper or magazine 114) into discrete containers for sets of three wrapped blocks 116 each. The turret 112 is associated with means for withdrawing successive blanks from the hopper 114 and for completing a first stage of conversion of successive blanks into containers. Such stage may involve folding the blanks, applying adhesive to selected portions of folded blanks and erection of adhesive-coated folded blanks so that each erected blank constitutes a partially finished container at least one end or side of which is open to allow for introduction of wrapped blocks 116. The containers are transferred onto the turret 113 to receive sets of three blocks 116 each and to be closed and sealed (if necessary) prior to transfer into the path D, E or F.

Figure 3:
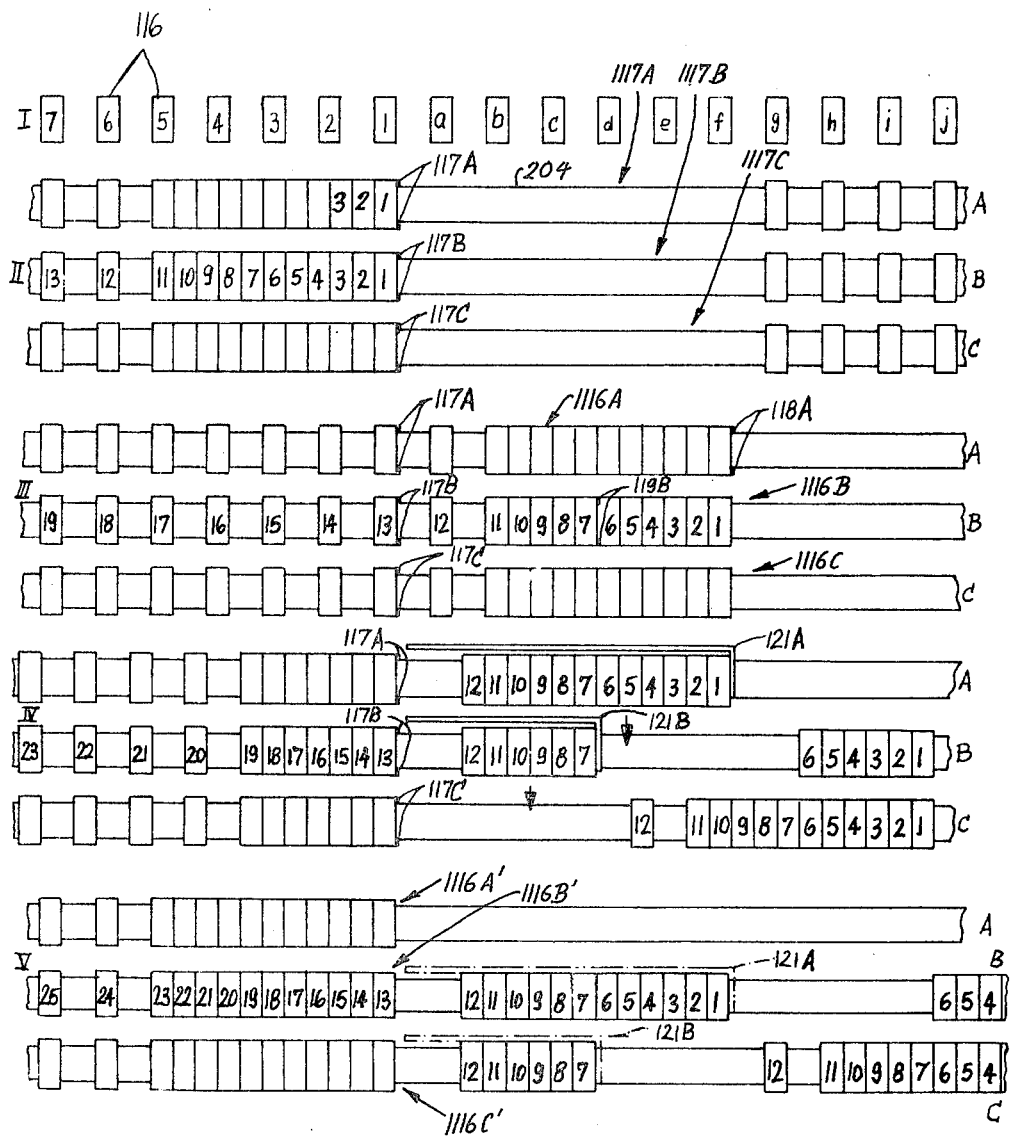
FIG. 3 is a diagram showing successive stages of one cycle of operation of the prorating means in the apparatus of FIG. 1.

FIG. 3 illustrates several successive stages of one complete cycle of operation of the prorating unit 107 when the packing machine 109A is idle, i.e., when the unit 107 must transfer blocks 116 from the path A into the paths B and C. The illustrated cycle is repeated, again and again, until the packing machine 109A is restarted so that it can process the blocks arriving along the paths A' and A.

The uppermost portion of FIG. 3 illustrates, at I, a row of discrete blocks 116 which are transported along the paths A' and A on to the packing machine 109A when the latter operates normally. It will be noted that successive blocks 116 are equally or nearly equally spaced apart from each other. The manner in which the blocks 116 advance along the paths B', B and C', C is the same. A cycle begins when the block 116 marked "1" reaches a certain portion of the path A in the prorating unit 107. The blocks 116 which are marked "a" to "j" were permitted to advance through the prorating unit 107 during the preceding cycle (e.g., prior to stoppage of the packing machine 109A). When the machine 109A is arrested, the prorating unit 107 receives a signal from a control unit 241 which is shown in FIG. 9 and may constitute a commercially available miniature computer. Such signal initiates the movement of three mechanical arresting devices 117A, 117B, 117C into the respective paths A, B and C (this is shown in FIG. 3, as at II) to intercept the oncoming blocks 116 and to cause the next-following blocks 116 to pile up behind the arrested blocks. As shown in FIG. 3, the arresting device 117A intercepts the block 116 marked "1" at the start of a cycle and causes the next-following blocks 116 (marked "2", "3", etc.) to pile up behind the arrested block marked "1". The conveyors which define the paths A, B and C are preferably narrower than the blocks 116 so that each arresting device (117A, 117B, 117C) may constitute an upturned bifurcated stop which rises from a level below the respective conveyor whereby its prongs flank the marginal portions of the respective conveyor to move into the path of the oncoming wrapped block 116 marked "1". The conveyors continue to advance, i.e., they slide with respect to the wrappers of the arrested blocks 116. The conveyor which defines the path A is shown at 204.

The fact that one or more arresting devices will rise while a block 116 is located thereabove does not adversely influence the operation of the prorating unit 107. The lifted block 116 is pushed forwardly by the oncoming block 116 and is caused to advance over the prongs of the respective arresting device to thereupon descend onto the corresponding endless conveyor and to be transported toward the corresponding storing unit 108A, 108B or 108C. In other words, it is not necessary to provide means for monitoring the gaps between successive blocks 116 in the paths A, B and C in order to insure that the arresting devices 117A, 117B, 117C will move to operative (intercepting) positions only at such times when their prongs do not strike against the underside of a block. All that is necessary is to provide means which hold the arresting devices 117A-117C in raised positions for certain intervals of time which are normally required to intercept a preselected number of oncoming blocks 116. For example, let it be assumed that the conveyor 204 which transports the blocks 116 along the path A advances 60 blocks 116 per minute, that the width of each block 116 (as considered in the longitudinal direction of the path A) is 65 mm, and that the width of gaps between neighboring blocks 116 in the path A is 2½ times the width of a block 116. This amounts to a conveyor speed of approximately 0.5 second. Each cycle is assumed to take up 6 seconds.

When a cycle is started, i.e., when the arresting devices 117A-117C are lifted to intercept the oncoming blocks 116 in the respective paths A, B and C, the arresting devices remain in operative positions for an interval of 2 seconds (i.e., one-third of the respective cycle). The conditions which prevail in the prorating unit 107 after the elapse of two seconds subsequent to start of a cycle are shown in FIG. 3, as at II. Thus, each of the arresting devices 117A-117C has caused a certain number of blocks 116 to pile up therebehind and the space in front of each of these arresting devices is empty (as at 1117A, 1117B, 1117C). The arresting devices 117A-117C are thereupon retracted (i.e., moved downwardly below the levels of the respective paths because it is assumed that the movement of such arresting devices to operative positions involves a lifting of their prongs to a level above the upper reaches of the respective conveyors). Each arresting device has accumulated a pile of twelve closely adjacent (abutting) blocks 116, and the piles are thereupon free to advance into the respective spaces 1117A-1117C. The arresting devices 117A-117C are lifted again after two seconds to start with accumulation of fresh piles (in the respective paths A, B and C). If the dimensions of the blocks 116 are as mentioned above, if the width of gaps between neighboring blocks 116 is normally 2½ times 65 mm, and if the conveyors which define the paths A, B and C are driven at a speed of 0.5 m per second, each of the lifted arresting devices 117A-117C invariably (or normally) enters the gap between the last block 116 of the freshly accumulated pile and the oncoming block 116.

The pile 1116A which was accumulated by the arresting device 117A during the first two seconds of the cycle advances into the respective space 1117A and is arrested by a second arresting or intercepting device 118A which may but need not be identical with the devices 117A-117C and which holds the pile 1116A against further movement toward the packing machine 109A (which is assumed to be idle). At the same time, a further arresting or intercepting device 119B rises into the path of movement of the seventh block 116 of the pile 1116B in the path B so that it intercepts one-half of the pile 1116B but allows the first six blocks 116 of such pile to advance along the path B toward the packing machine 109B. The path C downstream of the arresting device 117C remains unobstructed, i.e., the pile 1116C can advance in the space 1117C and on toward the packing machine 109C. The just described stage of the cycle is shown at III in the middle of FIG. 3. This stage is completed after elapse of two seconds following completion of the first stage, i.e., two thirds of the respective cycle are completed.

The third stage lasts 1.2 seconds and is shown in FIG. 3, as at IV. The arresting devices 117A-117C are in the process of accumulating third piles of twelve blocks 116 each, the space 1117A accommodates the pile 1116A which is held by the intercepting device 118A, the intercepting device 119B holds the rear half of the pile 1116B whereas the first six blocks 116 of such pile are on their way toward the packing machine 109B, and the pile 1116C is on its way toward the packing machine 109C. Two shifting devices 121A, 121B descend from above or from one side of the respective paths A and B to transfer the pile 1116A sideways from the path A into the path B, and to transfer the rear half of the pile 1116B sideways from the path B into the path C. Thus, each of the paths B and C receives one-half of blocks 116 of a complete pile because the path B receives a complete pile (1116A) from the path A and the path C receives one-half of a complete pile (1116B) from the path B. The illustrated shifting devices 121A, 121B are elongated L-shaped strips which have leading portions extending in front of the respective complete piles and half piles and lateral portions which can move the adjacent blocks 116 sideways from the path A into the path B (device 121A) and from the path B into the path C (device 121B).

The transfer of blocks 116 from the paths A and B into the paths B and C takes up 0.8 second and constitutes the last stage of the cycle. The completion of such stage is shown in FIG. 3, as at V. It will be noted that the pile 1116A is located in the path B and the rear half of the pile 1116B is located in the path C.

The next cycle begins immediately upon completion of the last stage of the preceding cycle. As shown in the lowermost part of FIG. 3, the arresting devices 117A-117C have completed the accumulation of fresh piles 1116A', 1116B', 1116C', and such piles are thereupon manipulated in the same way as described above in connection with the piles 1116A-1116C. The shifting devices 121A, 121B are withdrawn immediately after transfer of the respective blocks 116 into the paths B and C so that the transferred blocks can advance toward the respective packing machines 109B, 109C and provide room for introduction of fresh piles 1116A'-1116C' into the spaces 1117A-1117C. The stage V of FIG. 3 (first stage of the second cycle) corresponds to stage II of the preceding cycle. The arresting devices 117A-117C are about to descend so that the piles 1116A'-1116C' are free to advance into the respective spaces 1117A'-1117C'.

The mode of operation of the prorating unit 107 in the event of stoppage of the packing machine 109C is not shown in the drawing because such mode of operation is clearly analogous to that which is shown in FIG. 3. Thus, the prorating unit 107 then causes successive piles 1116C to move from the path C into the path B and transfers the rear halves of successive piles 1116B from the path B into the path A. In other words, the blocks 116 which advance along the paths C' and C are equally divided among the paths B and A whereby the path A receives (during each cycle) $m$ blocks 116 from the path B and the path B receives $2m$ blocks from the path C. FIG. 2 shows that the prorating unit 107 further comprises a shifting device 121C which can transfer successive piles 1116C from the path C into the path B and a shifting device 121B' which can transfer the rear halves of successive piles 1116B from the path B into the path A.

Figure 4:
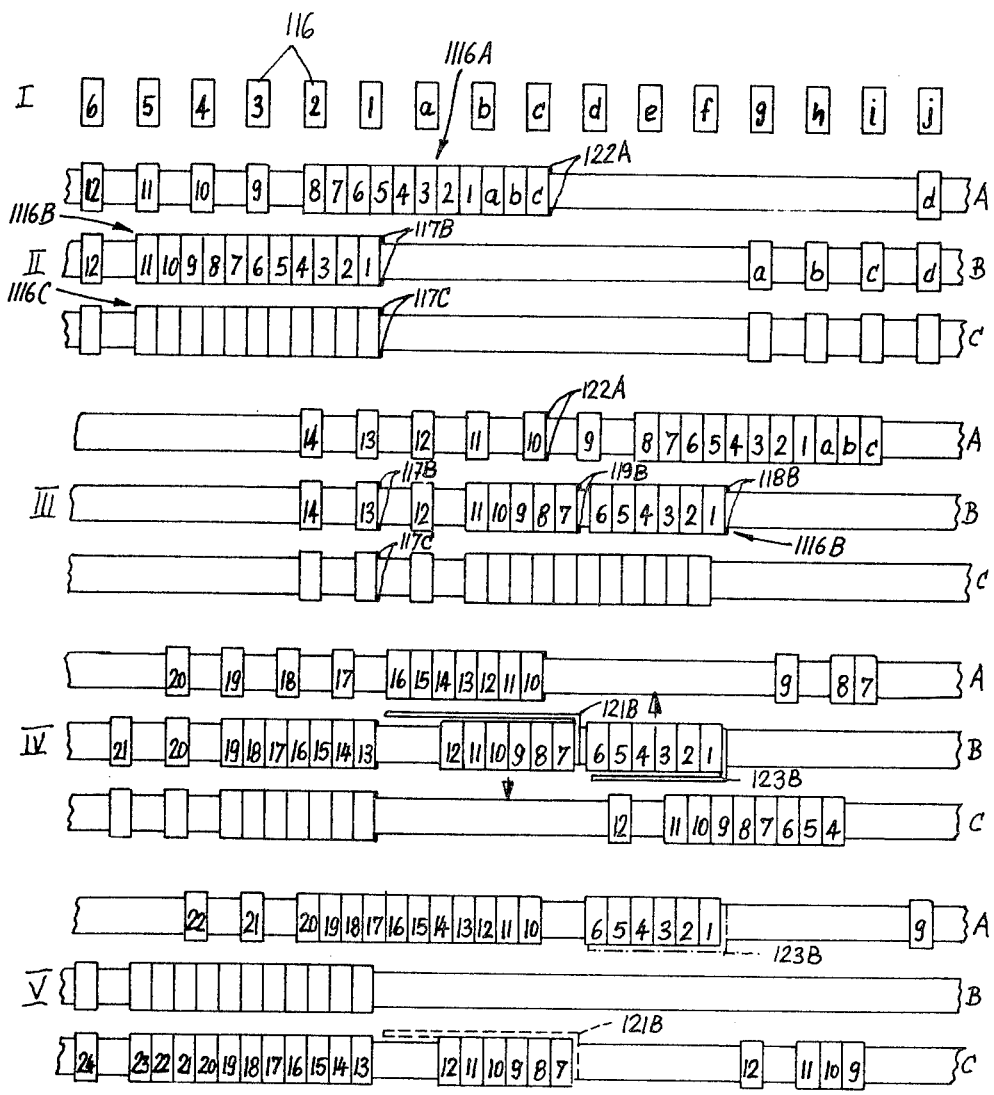
FIG. 4 is a similar diagram showing successive stages of a different cycle of operation of the prorating means in the apparatus of FIG. 1.

FIG. 4 shows one complete cycle of transfer of blocks 116 from the path B into the paths A and C. The path B is located between the paths A and C, and it is assumed that the packing machine 109B is out of commission. The prorating unit 107 comprises an arresting device 122A which is lifted into the path A instead of the aforementioned arresting device 117A. The arresting device 122A is located downstream of the arresting devices 117B, 117C which operate in the same way as described in connection with FIG. 3. It will be noted that the distance between the arresting devices 122A and 117B, as considered in the longitudinal direction of the path A, equals the combined width of approximately eight blocks 116. The intercepting device 118A of FIG. 3 remains inactive; instead, an intercepting device 118B of the prorating unit 107 rises into the path B ahead of the leader of an oncoming pile 1116B. The stage II of the cycle shown in FIG. 4 takes up two seconds, the same as the stage II of the cycle shown in FIG. 3. When the stage II is completed, a pile 1116A accumulates behind the intercepting device 122A, a pile 1116B accumulates behind the arresting device 117B, and a pile 1116C accumulates behind the arresting device 117C. The devices 122A, 117B, 117C thereupon descend and allow the respective piles to advance in a direction to the right, as viewed in FIG. 4. The second stage (advancement of piles 1116A-1116C along the respective paths A, B and C) takes up two seconds and the completion of this stage is shown at III. The devices 122A, 117B, 117C are thereupon lifted to their operative positions to begin with the accumulation of fresh piles. Upon completion of the stage III, the prorating unit 107 causes a further intercepting device 119B to rise into the path B, namely, in front of the seventh wrapped block of the pile 1116B. The intercepting device 118B remains in front of the foremost block 116 of the pile 1116B. It will be noted that the intercepting devices 118B, 119B divide the pile 1116B into two equal halves each containing six blocks 116.

Once the piles 1116A and 1116C advance beyond the locations of the arresting devices 122A, 117C, they are free to travel all the way to the respective packing machines 109A and 109C. The stage IV of FIG. 4 is reached after elapse of additional 1.2 seconds, i.e., the total duration of the cycle of FIG. 4 when the stage IV is completed is 5.2 seconds (out of a total of 6 seconds). A shifting device 121B is then lowered to a position adjacent the rear half of the pile 1116B, and a shifting device 123B is lowered to a position adjacent the front half of the pile 1116B. The devices 121B, 123B are located at the opposite sides of the pile 1116B, and they are thereupon moved in the directions indicated by arrows so that the first half of the pile 1116B is transferred into the path A and the second half of the pile 1116B is transferred into the path C. The transfer takes up 0.8 second, i.e., the cycle is completed and a complete pile 1116B has been divided in two halves, one for each of the paths A and C. The intermittently rising and descending devices 122A and 117C insure that the shifting devices 121B, 123B transfer the respective halves of the pile 1116B into empty spaces of the paths C and A. This last stage of the cycle which is illustrated in FIG. 4 is shown at V.

It will be seen that, when the packing machine (109B) which receives wrapped blocks 116 from the median path (B) is out of commission, the prorating device 107 divides successive piles (1116B) in the respective path (B) into two equal halves and causes the transfer of such halves into the other two paths (A and C). On the other hand, and as described in connection with FIG. 3, deactivation of the machine (109A or 109C) which is arranged to receive blocks 116 from an outer path (A or C) results in a different prorating of piles (1116A or 1116C) in the path leading to the deactivated packing machine but with the same ultimate result. Thus, the prorating unit 107 then transfers an entire pile (1116A or 1116C) into the median path (B) and a half pile from the median path (B) into the other outer path. In each instance, the blocks 116 which are on their way toward the deactivated packing machine are divided equally among the other paths which deliver the blocks to the operative packing machines.

FIGS. 5 to 9 show the means for controlling the operation of one (108A) of the storing units 108A, 108B, 108C. The storing unit 108A comprises three magazines or sections 207a, 207b, 207c, located one behind the other, as considered in the direction of movement of the upper reach of the belt conveyor 204 which defines the path A. The frames 208a, 208b, 209c of the respective magazines 207a-207c are secured to each other by means of bolts and nuts, screws or other suitable fasteners so that they form a rigid assembly whose components are located at both sides of and above the path A. The storing units 108B and 108C are identical with the storing unit of FIGS. 5 to 8. Furthermore, the magazine 207a is practically identical with the magazines 207b and 207c; therefore, all such counterparts of components of the magazine 207a which constitute elements of the magazines 207b and 207c are denoted by reference characters similar to those denoting the components of the magazine 207a but each followed by the letter "b" or "c".

Figure 6:
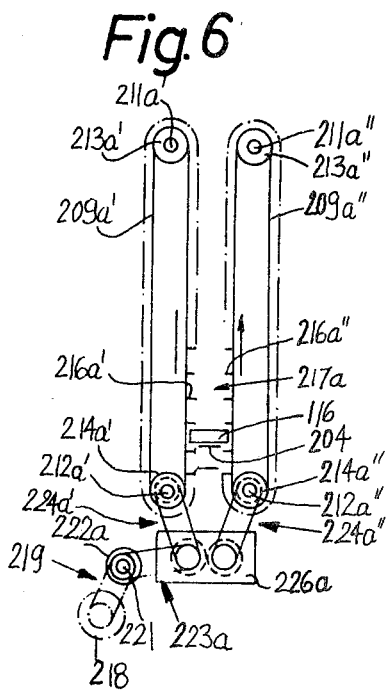
FIG. 6 is a schematic transverse vertical sectional view as seen in the direction of arrows from the line VI—VI of FIG. 5.

The magazine 207a comprises a first pair of endless toothed belts 209a' at one side of the continuously driven conveyor 204 and a second pair of endless toothed belts 209a" at the other side of the conveyor 204 (see FIGS. 5 and 6). These belts can be replaced with chains. The upper reach of the conveyor 204 is horizontal or nearly horizontal, and the block-carrying inner stretches of the toothed belts 209a', 209a" are vertical and are adjacent to the respective sides of the conveyor 204. The sprocket wheels 213a' for the upper end turns of the belts 209a' are mounted on a common horizontal shaft 213a' which is parallel to the upper reach of the conveyor 204, the sprocket wheels 214a' for the lower end turns of the belts 209a' are mounted on a common horizontal shaft 212a', the sprocket wheels 213a" for the upper end turns of the belts 209a" are mounted on a common horizontal shaft 211a", and the sprocket wheels 214a" for the lower end turns of the belts 209a" are mounted on a common horizontal shaft 212a". The belts 209a' and 209a" have outwardly extending supports in the form of platforms or rungs 216a', 216a". Each of the platforms 216a' in the elongated vertical channel 217a between the belts 209a' and 209a" is disposed in a common plane with a platform 216a" whereby the thus formed composite (two-piece) platform serves as a support to a set of blocks 116 in the channel 217a, to raise such blocks above the upper reach of the conveyor 204, or to lower the blocks onto the upper reach of the conveyor 204. The platforms 216a' and 216a" which extend into the channel 217a above the conveyor 204 divide the channel into a series of superimposed compartments each of which can receive a set of blocks 116.

FIG. 6 shows that the width of a block 116 (as considered transversely of the path A) exceeds the width of the conveyor 204 and that both lateral portions of a block 116 extend beyond the respective marginal portions of this conveyor. Such lateral portions of the blocks 116 which are located in the channel 217a are engaged by a set of two coplanar platforms 216a', 216a" when the inner reaches of the belts 209a', 209a" are caused to move upwardly whereby the just mentioned platforms lift the blocks 116 off the conveyor 204 and cause the lifted blocks to remain in the magazine 207a.

The drive means for moving the belts 209a', 209a" is operated stepwise so as to advance the belts through distances matching that between two neighboring platforms 216a' or 216a" on a belt 209a' or 209a". The drive means comprises a reversible prime mover 218 (shown in FIGS. 5 and 6) which transmits motion to a chain drive 219. The prime mover 218 (e.g., an electric motor) preferably transmits motion to the toothed belts of all three magazines 207a-207c. The chain drive 219 transmits torque to a horizontal main shaft 221 which is parallel to and is located at a level below the upper reach of the conveyor 204. The direction in which the motor 218 rotates the main shaft 221 depends upon whether the contents of a magazine are to be returned onto the conveyor 204 or whether the blocks 116 which are delivered by the conveyor 204 are to be stored in one of the magazines 207a-207c.

The main shaft 221 carries three friction clutches 222a, 222b, 222c which can be engaged or energized to respectively transmit torque from the main shaft 221 to three discrete chain drives including the chain drive 223a for the belts 209a', 209a" of the magazine 207a, a chain drive (not shown) for the belts of the magazine 207b (FIG. 5 shows the belts 209b'), and a chain drive (not shown) for the belts of the magazine 207c (FIG. 5 shows the belts 209c'). The chain drive 223a transmits motion to a chain drive 224a' for the shaft 212a' (i.e., for the toothed belts 209a') and to the input element of a reversing gear 226a whose output element transmits motion to a chain drive 224a" for the shaft 212a" (i.e., for the toothed belts 209a"). The reversing gear 226a insures that the inner reaches of the belts 209a' always move in the same direction (up or down) as the inner reaches of the toothed belts 209a". The construction of the means for moving the toothed belts of the magazines 207b, 207c in response to energization or engagement of the clutches 222b, 222c is analogous to that of the means including the parts 223a, 224a', 226a and 224a'.

The control means which regulate the transfer of blocks 116 from the upper reach of the conveyor 204 into the magazine 207a, 207b or 207c and the transfer of blocks from a magazine back onto the conveyor 204 is shown in FIG. 9. The control means of FIG. 9 comprises three reciprocable blocking devices or stops S1a, S1b, S1c which are normally held in retracted positions at a level below the upper reach of the conveyor 204 by associated electromagnets 227a, 227b, 227c. The stop S1a is located at the downstream end of that (elongated) portion of the upper reach of the conveyor 204 which extends through the magazine 207a, and the stops S1b, S1c are respectively located at the downstream ends of those portions of the upper reach of the conveyor 204 which extend through the magazines 207b, 207c ( as considered in the direction of advancement of blocks 116 along the path A). The purpose of stops S1a–S1c is to cause a pileup or accumulation of blocks 116 in the respective magazines when the associated electromagnets 227a–227c are energized to lift the corresponding stops into the path of the foremost oncoming block on the conveyor 204.

A further blocking device or stop S2 is located ahead of the foremost magazine 207a and is actuatable by an electromagnet 229 so that it can rise into the path of the foremost oncoming block 116 when the electromagnet 229 is energized whereby the stop S2 causes the blocks 116 to pile up immediately upstream of the channel 217a between the toothed belts 209a', 209a" of the magazine 207a. The construction of the stop S2 is preferably identical with or analogous to that of the stops S1a–S1c; therefore, FIG. 7 merely shows the details of the stop S2. This stop comprises two parallel arms 232', 232" which extend upwardly from the respective end portions of a horizontal crosshead or web 233 disposed at a level below the upper reach of the conveyor 204. The arms 232a', 232a" are located at the opposite sides of the conveyor 204 so that they can bypass the upper reach of this conveyor in response to energization of the electromagnet 229. The crosshead 233 is attached to the upper end of the reciprocable armature 230 of the electromagnet 229 and carries two downwardly extending parallel follower pins 234', 234" which are respectively reciprocable in upright guides or ways 236', 236". When the electromagnet 229 is deenergized, the armature 230 maintains the crosshead 233 in the lower end position of FIG. 7; the blocks 116 on the upper reach of the conveyor 204 are then free to advance past the stop S2 toward and into the channel 217a in the first or foremost magazine 207a. When the electromagnet 229 is energized, the crosshead 233 lifts the arms 232', 232" into the path of the oncoming block 116 and the arms prevent the block from entering the magazine 207a. The upper reach of the conveyor 204 then slides along the wrapper(s) of the arrested block(s) 116.

Figure 8:
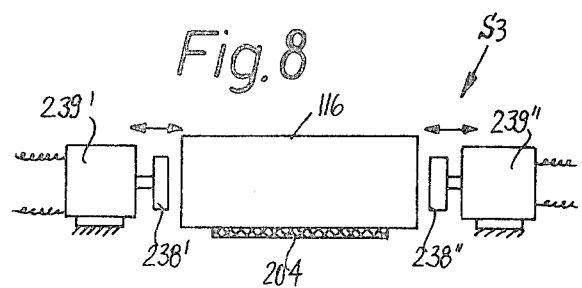
FIG. 8 is a similar view of a second intercepting device which is also installed ahead of the storing unit of FIG. 5.
Figure 7:
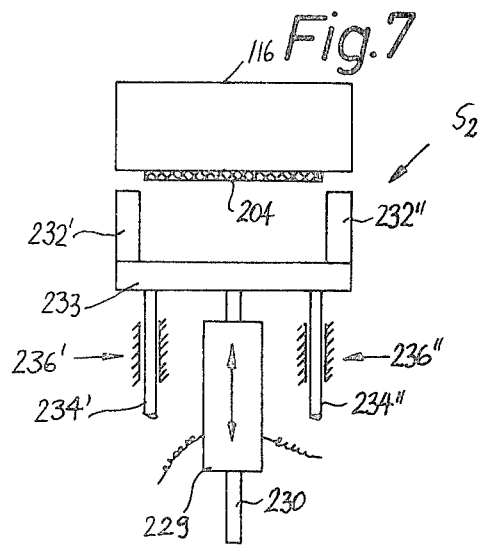
FIG. 7 is an enlarged fragmentary transverse vertical sectional view substantially as seen in the direction of arrows from the line VII—VII of FIG. 5, showing a device which serves to intermittently intercept blocks ahead of the storing unit of FIG. 5.

An additional blocking device or stop S3 is mounted adjacent the path A upstream of the stop S2. The distance between the stops S2 and S3, as considered in the longitudinal direction of the path A, equals or slightly exceeds the combined width of four blocks 116 plug the combined width of gaps between such blocks. FIG. 8 shows that the additional stop S3 comprises two platelike jaws or grippers 238', 238" which are located at the opposite sides of the upper reach of the conveyor 204 and are movable by the armatures of respective electromagnets 239', 239" in directions indicated by double-headed arrows, i.e., toward and away from the adjacent marginal portions of the upper reach of the conveyor 204. When the grippers 238', 238" are caused to move toward each other (on energization of the respective electromagnets 239', 239"), their front end faces engage the respective sides of one or more blocks 116 therebetween and prevent further movement of such block or blocks toward the stop S2. The means for retracting the grippers 238', 238" in response to deenergization of the electromagnets 239', 239" may comprise suitable springs, not shown. Analogously, the crosshead 233 of the stop S2 shown in FIG. 7 can be retracted by one or more springs (not shown) upon deenergization of the electromagnet 229. The same applies for the crossheads of the stops S1a–S1c.

The stop S3 can be simplified by omitting one of the electromagnets 239', 239", i.e., one of the grippers 238', 238" is then simply movable toward and away from the other gripper.

The control means of FIG. 9 further comprise photoelectric monitoring means for the gaps between the blocks 116 which approach the stops S1a, S1b, S1c and S2. These monitoring means respectively include photocells L1a, L1b, L1c and L2. The light source of each photocell is located at one side of the path A in the region of the corresponding stop, and the photosensitive receiver of the photocell is installed at the other side of the path A so that light beams issuing from the sources traverse the space above the upper reach of the conveyor 204 and the associated receivers transmit signals when exposed to or shielded from light rays issuing from the respective light sources.

The control means further include devices for monitoring the extent to which the magazines 207a, 207b, 207c are filled with sets of blocks 116. These monitoring devices are mounted at a level above the upper reach of the conveyor 204 and respectively include photocells L3a, L3b, L3c for the magazines 207a, 207b, 207c. The light sources of photocells L3a–L3c emit light rays diagonally across the respective magazines.

A further monitoring device of the control means is associated with the additional stop S3 and includes a photocell L4 which detects the gaps between successive blocks 116 approaching the stop S3. The light beam issuing from the light source of the photocell L4 traverses the path A at a level above the upper reach of the conveyor 204 and makes an acute angle with the direction of forward movement of blocks 116 to thus insure that the monitoring device L4 detects gaps having a predetermined minimum width.

The control means also comprise devices for monitoring the number of blocks 116 which pile up behind the stop S2 when the electromagnet 229 is energized to maintain the arms 232', 232" in raised or operative positions. The just mentioned monitoring devices comprise four sensors T1, T2, T3, T4 which are respectively displaced by the foremost, second, third and fourth blocks 116 behind the lifted stop S2 and then transmit signals to the corresponding inputs of an AND-gate 240 whose output is connected to the corresponding input b of the computer 241.

The position of the stop S2 is monitored by a sensor T5 which transmits signals to the input d of the computer 241.

The magazines 207a, 207b, 207c respectively contain sensors T6a, T6b, T6c which are actuatable by successive platforms (216) of the respective toothed belts (209). The magazines 207a–207c further contain sensors T7a, T7b, T7c which are displaced by that one of the platforms (216) which carries the uppermost set of blocks 116 when the corresponding magazine is filled to capacity. To this end, a predetermined platform in each of the three magazines includes a trip (e.g., a suitable extension) which engages the respective sensor T7a, T7b or T7c when the corresponding magazine is full. All other platforms (216) simply bypass the respective sensors T7a–T7c, provided there are platforms above such sensors when the corresponding magazines are full of blocks. The trips of the aforementioned platforms can further actuate sensors T8a, T8b, T8c which are mounted at a level below the upper reach of the conveyor 204 and are respectively associated with the magazines 207a, 207b, 207c.

The reference characters (a to t) which are adjacent to the inputs of the computer 241 designate those monitoring means and sensors which transmit signals to such inputs. For example, the input m receives signals from the sensor T8b, the input q receives signals from the receiver of the photocell L1c, and so forth.

A conductor u connects the computer 241 with one contact of a switch 242 which is automatically opened or closed in response to stoppage of one of the packing machines 109A–109C. The means for actuating the switch 242 may comprise a device which monitors the speed of variable-speed prime movers (not shown) for the packing machines 109A–109C and actuates the switch 242 when a packing machine comes to a halt.

The outputs (designated by the reference characters A to L) of the computer 241 transmit signals by way of an operational amplifier 243. The purpose of signals which are transmitted by the outputs A to J will be described below. The output K transmits signals to those packing machines (109) whose capacity (output) is to be increased in response to stoppage of one of these machines, and the output L transmits signals to the prorating unit 107 and/or to a suitable device (e.g., buzzer, bell or one or more signal lamps) which transmits or transmit visible and/or audible signals in response to stoppage of one of the packing machines 109A–109C.

The purpose of signals which are transmitted by the receivers of the photocells L1a, L1b, L1c and L2 is to initiate movements of the respective stops S1a, S1b, S1c, S2 to operative positions. As shown in FIG. 9, the receivers of the just mentioned photocells transmit signals to the inputs f, l, q, c, and the electromagnets 227a, 227b, 227c, 229 receive signals from the outputs C, E, G, B of the computer 241.

The signals which are furnished by the receivers of the photocells L3a, L3b, L3c are respectively transmitted to the inputs e, k, p of the computer 241, and the outputs D, F, H of the computer then respectively transmit signals to energize the clutches 222a, 222b, 222c. Such signals are transmitted when the blocks 116 are to be transferred from the respective magazines 207a–207c onto the upper reach of the conveyor 204.

The signal which is transmitted (to a of 241) by the receiver of the photocell L4 is used to initiate a program involving the transfer of blocks 116 from the magazine 207a, 207b or 207c onto the conveyor 204. The program includes activation of photocells L2 and L3a or L2 and L3b or L2 and L3c (i.e., completion of the circuit of the respective light sources) and starting of the reversible motor 218 in a direction to move the inner reaches of toothed belts (209) in the magazine whose clutch (222) is engaged in a downward direction. The just mentioned program is started when the photocell L4 detects a gap. If the photocell L4 fails to detect a gap within a predetermined interval which is seleected by the computer 241, the latter initiates a program which involves the transfer of blocks 116 into the magazine 207a, 207b or 207c. Such modified program includes activation of the photocells L1a, L2 or L1b, L2 or L1c, L2 and of the sensors T1 to T5. Also, the reversible motor 218 is started in a direction to move the inner reaches of the toothed belts (209) in the corresponding magazine upwardly so that the platforms (216) lift sets of blocks 116 off the upper reach of the conveyor 204. Still further, the modified program includes energization of electromagnets 229, 239', 239" to enable the stop S2 (in cooperation with the stop S3) to accumulate successive groups of four blocks 116 each. The sensor T5 serves to transmit a signal in response to advancement of a group of four blocks 116 beyond the stop S2, i.e., this sensor is actuated whenever the stop S2 moves to its lower end position. The signals which are furnished by the sensor T5 are transmitted to a counter of the computer 241 (via input d) so that the computer is in a position to engage the clutch 222a, 222b or 222c at an appropriate time (when a set of twelve blocks is ready to be lifted off the conveyor 204).

The sensors T6a, T6b, T6c transmit signals to the inputs h, n, s of the computer 241 to disengage the respective clutches 222a, 222b, 222c.

The signals which are transmitted by the sensors T7a, T7b, T7c (to the inputs i, o, t of the computer 241) denote that the respective magazines are filled to capacity. Moreover, such signals are used for determination of that magazine which is to receive or is to be relieved of blocks 116. During storing, the magazines are filled in the following sequence: 207a, 207b, 207c. During evacuation, the contents of the magazine 207b are evacuated ahead of the magazine 207a but after the magazine 207c. When each of the sensors T7a-T7c indicates that the respective magazine is filled to capacity, the output L of the computer 241 transmits a signal (via amplifier 243) to actuate the prorating unit 107 and/or to cause the generation of a visible and/or audible alarm signal.

The signals which are generated by the sensors T8a, T8b, T8c are respectively transmitted to the inputs g, m, r of the computer 241 and denote that the corresponding magazines are empty. Furthermore, the absence of a signal from the sensor T8a, T8b or T8c denotes that the corresponding magazine contains at least some blocks 116. In the latter instance, the output K of the computer 241 transmits signals to the operative packing machines (109) so as to increase their outputs, e.g., by 20 percent. This automatically entails an acceleration of the conveyor 204 and the computer selects a program for evacuation of wrapped blocks 116 from the magazines (refer also to the function of the photocell L4).

The signals which are transmitted by the switch 242 can override the signals from the receiver of the photocell L4 and serve to start the program for transfer of wrapped blocks 116 from the conveyor 204 into the selected magazine (compare again the function of the photocell L4).

The operation of the storing unit 108A is as follows:

All operations are initiated in response to signals from the outputs A-L of the computer 241. Such signals are amplified at 243 before they reach the respective components of the storing unit 108A and/or prorating unit 107. It is assumed that the operation of the apparatus is "normal", i.e., that the packing machines 109A to 109C process all blocks 116 which are respectively delivered along the paths A, B and C, and that the prorating unit 107 and the storing units 108A-108C are idle. For example, and as shown in FIG. 5, the blocks 116 which are caused to advance along the path A are equally (or nearly equally) spaced apart from each other and accumulate (on the upper reach of the conveyor 204) immediately ahead of the packing machine 109A so that the latter can introduce three blocks 116 into each container which is thereupon transferred into the path D for delivery into the path G and on to the next processing machine. The photocell L4 is addressed by the computer 241 within each of a series of successive intervals, and its signals indicate the presence of gaps between successive blocks 116. Therefore, the monitoring means which are associated with the storing units 108A-108C are inactive, the same as the stops, clutches and other activatable and deactivatable components of the storing units.

If the packing machine 109A is arrested, the switch 242 transmits a signal via conductor u, and such signal causes the computer 241 to select a program for introduction of blocks 116 into the storing unit 108A. The program involves immediate activation of the photocell L1a in the magazine 207a so that the latter can detect an oncoming gap between two successive blocks 116 and transmits a signal to the input f of the computer 241 whereby such signal initiates the transmission of a signal via output C to energize the electromagnet 227a which causes the stop S1a to assume its operative position. The photocell L2 is also activated so that it detects the oncoming gap between the blocks 116 approaching the stop S2 and transmits a signal to the input c of the computer 241 whereby the latter energizes the electromagnet 229 via output B to move the stop S2 to the operative position. The computer 241 further transmits a signal to complete the circuit of the motor 218 whereby the latter drives the main shaft 221 in a direction which is necessary to move the inner reaches of the toothed belts (209) upwardly, i.e., in a direction to enable the respective magazine (207) to accept and store sets of blocks 116.

Shortly after the stop S1a is raised to the operative position, the computer 241 engages the clutch 222a so that the toothed belts 209a', 209a" of the magazine 207a are set in motion. The upwardly moving platforms 216a', 216a" of the belts 209a', 209a" lift that set of blocks 116 which accumulates in front of the stop S1a, i.e., such set of blocks is raised in the channel 217a to a level above the upper reach of the conveyor 204. When the belts 209a', 209a" advance by a step, one of the platforms 216a' or 216a" which carry the freshly lifted set of blocks 116 actuates the sensor T6a which immediately disengages the clutch 222a so that the next-following pair of coplanar platforms 216a', 216a" remains at a level below the upper side of the upper reach of the conveyor 204. The space above the conveyor 204 below the lifted set of blocks 116 is then available for introduction of fresh blocks.

Since the stop S2 has been lifted to operative position, it causes the oncoming blocks 116 to pile up upstream of the foremost magazine 207a. When the stop S2 arrests four successive blocks 116, the four sensors T1-T4 simultaneously transmit signals to the corresponding inputs of the AND-gate 240 whereby the output of the gate 240 transmits a signal to the input b of the computer 241. Such signal results in transmission of a signal via output A to energize the electromagnets 239', 239" of the stop S3. The grippers 238', 238" move toward each other to engage and hold the blocks 116 therebetween. FIG. 9 shows that the grippers 238', 238" are rather long, i.e., they can simultaneously engage several blocks 116 provided that the neighboring blocks in the region of the stop S3 are sufficiently close to each other. At any rate, the grippers 238', 238" invariably engage and arrest that block 116 which follows the set of four blocks in register with the sensors T1 to T4. The electromagnet 229 is deenergized immediately after energization of the electromagnets 239', 239" so that the stop S2 descends and permits the freshly accumulated group of four aligned blocks 116 to enter the foremost magazine 207a. The descending stop S2 actuates the sensor T5 which transmits a signal to the input d of the computer 241 which stores the signal in its counter.

As the conveyor 204 advances the group of blocks 116 which were accumulated by the stop S2, such blocks move past the photocell L2 and the latter transmits a signal which results in return movement of the stop S2 to the raised or operative position as well as in deenergization of electromagnets 239′, 239″ so that the grippers 238′, 238″ permit the blocks 116 therebetween (and the next-following blocks) to advance toward and to be arrested by the stop S2. The just described procedure is repeated two more times, i.e., the stop S2 accumulates a group of four wrapped blocks 116, it is thereupon retracted to permit the freshly accumulated group to enter the magazine 207a, it is thereupon lifted to intercept the foremost block of the next group, and it is retracted to permit the third group of blocks 116 to advance toward the stop S1a. When the sensor T5 transmits the third of three consecutive signals to the aforementioned counter of the computer 241, the latter transmits a signal via output D to energize the clutch 222a with a certain delay so that the lowermost coplanar platforms 216a′, 216a″ rise by a step and lift a set of twelve consecutive blocks 116 into the lowermost zone of the channel 217a.

The just described sequence of steps is thereupon repeated, i.e., the stops S2 and S3 cooperate to accumulate three groups of four blocks 116 each, such groups of blocks form a row or set of twelve consecutive blocks behind the lifted stop S1a, and the clutch 222a is engaged to enable the toothed belts 209a′, 209a″ to lift the three groups of blocks into the lowermost zone of the channel 217a.

When the magazine 207a is filled to capacity, the sensor T7a transmits a signal to the input i of the computer 241 whereby the latter transmits (or ceases to transmit) a signal via output C to deenergize the electromagnet 227a so that the stop S1a reassumes its retracted position. At the same time, the output E of the computer 241 transmits a signal to energize the electromagnet 227b whereby the stop S1b rises and prevents the blocks 116 from advancing beyond the magazine 207b. The magazine 207b is thereupon filled with rows or sets of twelve blocks 116 each in the same way as described in connection with filling of the magazine 207a, i.e., the clutch 222b is energized at certain intervals which are determined by the length of intervals needed to insure that the space behind the lifted stop S1b accommodates a row or set of twelve closely adjacent blocks 116. The delay with which the clutch 222b is energized following each third retraction of the stop S2 is somewhat longer than during filling of the foremost magazine 207a because the groups of blocks which are released by the stop S2 must cover a longer distance on their way into the magazine 207b.

When the magazine 207b is filled to capacity, the sensor T7b transmits a signal to the input o of the computer 241 whereby the output G transmits a signal for energization of the electromagnet 227c which raises the stop S1c to operative position. At the same time, the electromagnet 227b is deenergized and the stop S1b descends to permit successive groups of blocks 116 to advance toward and to be arrested by the stop S1c in the rearmost magazine 207c. The computer 241 then intermittently energizes the clutch 222c so that the toothed belts of the magazine 207c lift successive sets or rows of twelve blocks 116 each until the magazine 207c, too, is filled to capacity. Such complete filling of all three magazines is infrequent because the combined storing capacity of magazines 207a–207c is rather substantial. In other words, the magazines 207a–207c are filled to capacity only when the elimination of the malfunction of the packing machine 109A necessitates an inordinately long interval of time. However, if the sensor T7c transmits a signal, the computer 241 transmits a signal via output L to activate the prorating unit 107 and/or to initiate the generation of a visible and/or audible signal. The alarm informs the attendant or attendants that the blocks 116 which advance toward the prorating unit 107 must be removed by hand or that the time is approaching when the entire apparatus will be filled to capacity. It has been found that, in most instances, the magazines 207a–207c suffice to insure that the removal of blocks 116 by hand need not be carried out at all because a malfunction of the packing machine 109A can be detected and eliminated before the rearmost magazine 207c is completely filled.

It is further to be borne in mind that, when the computer 241 transmits a signal to the prorating unit 107, the latter transfers blocks from the path A into the paths B and C in a manner as described in connection with FIG. 3, and that the thus transferred blocks can be stored in the units 108B and 108C before the entire apparatus is completely filled with blocks. The transfer of blocks into the storing unit 108B and/or 108C is also controlled by the computer 241.

It is advisable to maintain the storing unit 108A of FIGS. 5 and 6 in a condition of readiness for reception of wrapped blocks 116. Therefore, the apparatus is preferably constructed, assembled and operated in such a way that the contents of the storing unit 108A are transferred back onto the conveyor 204 as soon as the packing machine 109A is restarted. This is insured by the provision of sensors T8a–T8c. The sensor T8a is released by the lowermost platform 116a′ or 116a″ of one of the belts 209a′ or 209a″ in the foremost magazine 207a as soon as the latter stores a single row of twelve blocks 116. This enables the sensor T8a to transmit a signal to the input g of the computer 241 which selects a program for evacuation of the contents of the magazine 207a. Such program begins when the packing machine 109A is restarted. The output K of the computer 241 then transmits a signal which causes the machine 109A to raise its output (e.g., by 20 percent). If the filled or partially filled magazine or magazines form part of the storing unit 108B or 108C (i.e., of that storing unit which is adjacent to a path leading to a packing machine which was not out of commission), the evacuation of the contents of the respective storing unit (108B or 108C) is started as soon as the output of the corresponding packing machine 109B or 109C is returned to normal. Such machine is then caused to increase its output so that it can accept the blocks which advance along the respective path B or C (i.e., from the respective path B′ or C′) as well as the blocks which are about to be removed from the storing unit 108B or 108C.

The output of the packing machine 109A, 109B or 109C automaticlly increases when the storage of blocks in the corresponding units 108A, 108B, 108C is initiated by the respective photocells L4.

The signal for evacuation of the contents of a storing unit 108 is delayed if one of the magazines 207A, 207b, 207c in such unit is in the process of accepting a row or set of twelve blocks 116. However, when the photocell L4 thereupon transmits a signal which indicates the detection of a gap between successive blocks 116, the computer 241 completes the circuit of the light source of the photocell L2 which causes the stop S2 to rise as soon as the cell L2 detects the presence of a gap which can receive the upper portion of the stop S2. If only one (namely T8a) of the three sensors T8a–T8c is released, i.e., if only one (207a) of the three magazines contains stored blocks 116, the computer 241 activates the photocell L3a. The photocell L3b is activated if the condition of the sensor T8b indicates the presence of blocks 116 in the magazine 207b, and the photocell L3c is activated if the condition of the sensor T8c is indicative of the presence of blocks 116 in the last or rearmost magazine 207c. In the latter instance, the photocell L3c transmits a signal to the input p of the computer 241 as soon as it detects that the space immediately above the upper reach of the conveyor 204 in the magazine 207c is empty, i.e., that the stop S2 has intercepted the oncoming blocks 116 ahead of the magazine 207a. This means that the entire length of conveyor 204 between the upstream end of the magazine 207a and the raised stop S1c in the rearmost magazine 207c is free of blocks.

The motor 218 is started in reverse as soon as the program for evacuation of magazines 207a–207c begins. The clutch 222c is energized to move the platforms between the inner reaches of the toothed belts in the magazine 207c downwardly so that the lowermost row of twelve blocks 116 is returned onto the upper reach of the conveyor 204. The clutch 222c is disengaged by the sensor T6c after each stepwise advance (descent) of platforms in the channel of the magazine 207a. At the same time, the sensor T6c causes the electromagnet 229 to retract (or permit retraction of) the stop S2 so that the conveyor 204 can advance the row of blocks 116 which were removed from the magazine 207c as well as the blocks which accumulate behind the stop S2. When the photocell L4 again detects the presence of a gap, the stop S2 returns to the operative position and the clutch 222c is engaged when the photocell L3c transmits a signal denoting that the upper reach of the conveyor 204 in the magazine 207c is free to receive a row of twelve blocks 116. When the evacuation of blocks from the magazine 207c is completed, the sensor T8c is deactivated and the computer 241 thereupon initiates the evacuation of blocks 116 from the magazine 207b (i.e., the clutch 222b is energized at requisite intervals until the condition of the sensor T8b denotes that the magazine 207b is empty. The same procedure is thereupon followed in connection with the evacuation of blocks 116 from the foremost magazine 207a. The computer 241 ceases to transmit signals for intermittent energization of the clutch 222a when the condition of the sensor T8a is indicative of the fact that the magazine 207a is empty. The photocell L2 is deactivated when the magazine 207a is empty, i.e., the evacuating program is completed and the stop S2 remains in the lower end position so that all blocks 116 which arrive from the path A' are free to advance along the path A and all the way to the inlet of the packing machine 109A. At the same time, the computer 241 transmits a signal to reduce the output of the packing machine 109A, i.e., this machine then operates at a speed which is just sufficient to process all blocks 116 which are delivered along the path A.

When the evacuation of the contents of the magazines 207a–207c is completed, the storing unit 108A remains empty so that it can receive a maximum number of blocks 116 when the need arises, either in response to renewed breakdown of the packing machine 109A or in response to breakdown of another packing machine for an interval of time which is long enough to warrant admission of blocks into the storing unit 108A in spite of the fact that the machine 109A is running at maximum capacity. As mentioned above, such situation can arise when one of the packing machines 109A–109C is idle, when the other two machines operate at a maximum capacity and when such operation of the remaining packing machines still fails to result in the processing of all blocks which are delivered along the paths A', B' and C'. The prorating unit 107 is then activated to deliver blocks froom one of the paths A–C into the other two paths and to activate the storing unit or units adjacent to the path(s) leading to the operative packing machine(s).

In order to insure that the apparatus is always ready for admission of wrapped blocks into the storing units 108A–108C, it is necessary to operate in such a way that the blocks 116 which advance past the stop S2 are separated from each other by gaps, i.e., that the photocell L2 can detect gaps in order to effect the movement of stops S2 to the raised or operative position. As explained above, the stop S2 rises only when the photocell L2 detects a gap between the adjacent blocks 116. Moreover, the width of such gaps (as considered in the longitudinal direction of the respective path A, B or C) must be sufficient to enable the stop S2 to move toward its upper end position between two neighboring blocks. This is insured by the provision of the photocell L4 which is mounted in such a way that it detects gaps having a predetermined minimum width. As a rule, the mode of operation of wrapping units 104A, 104B, 104C is such that these units insure the development of relatively wide gaps between the blocks 116 which advance along the paths A', B', C' and thereupon along the paths A, B, C. However, such relatively wide gaps are often filled by one or more attendants who insert blocks which were removed during a longer-lasting interruption of operation of one of the packing machines 109A–199C, namely, when the operation of one of these packing machines was interrupted for an interval of time long enough to cause complete filling of all three storing units 108A–108C while the remaining two packing machines (109) were operated at a maximum speed. If this is the case, the photocell L4 fails to transmit signals (denoting gaps of required width) during each of a series of predetermined intervals selected by the computer 241. The absence of such signals immediately initiates activation of the corresponding storing unit. If the foremost magazine of the corresponding storing unit is not completely filled, the blocks are introduced into the foremost magazine; otherwise the blocks are introduced into the magazine 207b or 207c.

The absence of a signal from the photocell L4 within a given interval causes the computer 241 to transmit a signal via output C to energize the electromagnet 227a which moves the stop S1a to operative position. The photocell L2 is activated and detects the next gap to initiate the movement of stop S2 to the operative position. As a rule, the photocell L2 will detect a gap with a minimum of delay since it is highly unlikely that the attendants would fill each and every gap between neighboring blocks 116 in the space between the respective wrapping unit 104 and the prorating unit 107. The blocks which accumulate behind the stop S1a (it being assumed that the foremost magazine 207a has room for introduction of additional sets of blocks) are transferred into the channel 217a. The stops S2 and S3 cooperate to insure that each set which is lifted into the channel 217a contains the same number (twelve) of blocks 116. These stops cooperate to insure the accumulation of twelve blocks behind the stop S1a even if the photocell L4 detects a fresh gap of requisite width. In other words, once the storing operation is started, it proceeds to completion, i.e., the belts 209a', 209a" are set in motion when the respective stop S1a interferes with forward movement of twelve consecutive blocks 116.

Each storing operation invariably initiates the setting up of an evacuating program and acceleration of the respective packing machine 109 so that the output of such machine increases beyond the normal output. Consequently, the conveyor 204 is driven at a higher speed which normally suffices to insure that the blocks advancing toward the operative storing unit 108 are separated by gaps of requisite width. The storing of blocks 116 in the magazine 207a is terminated as soon as the photocell L4 detects a gap of required width upon completion of the storing step. The just described part of the program which is stored in the computer 241 insures that a gap develops behind each set of blocks 116 which accumulate behind the stop S3; such gap enables the photocell L2 to initiate the movement of stop S2 to its operative position.

If the switch 242 transmits a signal via conductor u while the storing unit 108A is in the process of transferring a row or set of twelve blocks 116 into the magazine 207a, 207b or 207c (i.e., if a packing machine 109 is arrested during actuation of a storing unit), the storing operation simply continues. In other words, the signal which is transmitted via conductor u merely "confirms" the signal which has been transmitted by the receiver of the photocell L4. It will be noted that the storing units can perform their functions even at such times when the blocks 116 are not separated from each other by gaps of desired or required width.

The present invention is based, in part, on recognition that the presently prevailing trend in the industry (namely, to increase the speed and size and hence the output of machines) is not satisfactory in connection with the processing of bakery products of the type known as or resembling biscuits. Thus, instead of utilizing a single high-capacity packing machine, a single high-capacity wrapping unit and a single large-volume storing unit, the apparatus of the present invention employs several relatively small packing machines whose normal output is not or need not be very high. Such relatively small (and hence simple) and relatively slow packing machines exhibit several important advantages, namely, they are much less prone to malfunction than a giant high-speed packing machine, they are less likely to damage or deface the commodities which are processed therein, and their servicing does not require lengthy training of personnel. Moreover, and since the output of the oven is processed by several discrete wrapping units and packing machines, temporary stoppage of one packing machine or one wrapping unit does not necessitate immediate stoppage of the oven. On the contrary, and as described above, the output of the oven can remain unchanged and the attendants will be required to remove some of the blocks 116 only under unusual circumstances, e.g., during the last stage of a prolonged stoppage of one of the packing machines. The likelihood of need for manual removal of blocks 116 is reduced in several ways, namely, by the provision of several packing machines, by the provision of control means for varying the output of each packing machine independently of the other packing machines, by the provision of several storing units and by the provision of the prorating unit. It is clear that the number of packing machines can be reduced to two or increased to three or more. The presently preferred number is three because the output of each of only two packing machines would have to be varied by up to 100 percent if a first machine were to process the biscuits which issue from the oven while the second machine is idle. The provision of more than three packing machines is evidently within the purview of the invention; all that is necessary is to provide additional conveyor means, additional wrapping units, additional storing units, a somewhat more complex prorating unit and somewhat more complex control means for the storing and prorating units.

The wrapping units 104A-104C are optional. However, such units are desirable and advantageous because it is simpler to transport and manipulate blocks of arrayed biscuits than discrete biscuits. First of all, the apparatus is less likely to be contaminated by fragments of biscuits. Secondly, the biscuits are less likely to be contaminated if they are provided with wrappers in a region close to the oven. Furthermore, the manipulation of blocks of biscuits is simpler than manipulation of discrete biscuits. It is clear, however, that the manipulation of blocks 116 downstream of the wrapping units 104A-104C, too, must involve gentle treatment of the processed commodities, especially in the case of very thin and hence highly fragile wafers, saltines or the like. The aforedescribed prorating unit and the storing units are designed with a view to avoid any strong impact of blocks 116 against the parts of the apparatus or vice versa and to thus insure that the percentage of damaged commodities is extremely low.

A further important advantage of the improved apparatus is that it occupies a surprisingly small amount of floor space. This is due to the provision of a simple and compact prorating unit which can transfer blocks 116 from one path into other paths in a small area, as well as to the provision of orientation changing means and large-capacity storing units which store long sets of blocks one above the other.

The feature that the prorating unit 107 comprises means for shifting the accumulated blocks sideways from one of the paths into the other paths also contributes to compactness of the apparatus because it reduces the dimensions of the prorating unit. Moreover, the arresting devices of the prorating unit constitute a very simple, compact and reliable arrangement for providing spaces in those paths which are about to receive blocks 116 from the path terminating at the idle packing machine. The spaces for the transfer of blocks from one path into the other paths are preferably long or reasonably long so as to avoid the transfer of blocks at frequent intervals. Moreover, the arresting devices which accumulate piles of blocks 116 upstream of the locus of shifting devices insure that the spaces for transfer of blocks from one path into the other paths remain unobstructed during transfer of blocks. This, in turn, renders it possible to move the shifting devices at a relatively low speed so that they are highly unlikely to damage or deface the biscuits.

The output of each packing machine can be increased to the extent which is necessary to insure that, in the case of three packing machines, two machines can process the entire output of the oven 101. This means that each packing machine should normally operate at $\frac{2}{3}$ of its maximum capacity and will operate at full capacity when one of the packing machines is idle. Such packing machines would obviate the need for one or more storing units. It has been found that the initial and maintenance cost of packing machines can be reduced significantly if the machines are designed to normally operate at a capacity which is not substantially below maximum capacity (e.g., if the output of each packing machine can be increased by 20 percent above the normal or average output when all packing machines are in working order). Such machines are simpler and less prone to malfunction. The storing units 108A-108C are provided in apparatus wherein the combined maximum output of n-1 packing machines (wherein n is the total number of packing machines) is less than the combined average or normal output of n machines. As a rule, the apparatus of FIGS. 1 to 9 will operate in such a way that the storing unit which precedes the arrested packing machine is first to receive blocks 116, even before the prorating unit 107 is actuated. In many instances, the idling of a packing machine is of short duration so that the associated storing unit is capable of accepting blocks which are conveyed along the respective path. If a packing machine is idle for a longer interval of time, the prorating unit 107 is activated not later than immediately prior to complete filling of the storing unit which is associated with the idle packing machine to insure that the remaining blocks which would normally advance to the idle packing machine will be transferred into the other paths, either for direct delivery to the operative packing machine or for introduction into the other storing units. As mentioned above, the provision of a discrete storing unit for each of the paths normally suffices to allow for automatic retention of all blocks 116 in the apparatus even if a packing machine is idle for a relatively long interval of time and even if the difference between the normal or average and maximum outputs of a packing machine is less than that which is necessary to enable the remaining packing machines to process the entire output of the oven while a packing machine is idle. In other words, and referring to the embodiment of FIGS. 1-9, it suffices if the maximum output of each packing machine is approximately 20 percent above the average output even though an increase of 50 percent would be necessary to enable two packing machines to process the entire output of the oven when one of the packing machines is inactive.

In many instances, the dimensions of biscuits, and hence the dimensions of blocks 116, vary within an extremely wide range. This is unavoidable in the mass production of certain types of bakery products, for example, due to non-uniformity of the dough, non-uniform heating action, carelessness of attendants and certain other factors. Therefore, the storing units 108A-108C are designed to insure that they can store blocks 116 whose dimensions vary or are likely to vary within a wide range. Thus, the stops S2 and S3 cooperate to accumulate groups each of which contains a predetermined number of blocks 116 (e.g., four blocks). The combined length of three groups of blocks 116 which are to be stored in the compartments of channels in the magazines 207a-207c is preferably selected in such a way that such length is invariably less than the length of the conveyor portion 204 in a magazine, even if the dimensions of some or all of the blocks 116 which form a row on a pair of platforms 216 deviate substantially from a desired norm. The sensors T1-T4 upstream of the stop S2 cooperate with the sensor T5 insure that each row of blocks 116 which is transferred from the conveyor 204 into a magazine invariably contains the same number of blocks so that, once the length of the channel in a magazine (as considered in the longitudinal direction of the conveyor 204) suffices to accommodate twelve blocks of maximum length, the blocks which are stored in the magazines are not damaged during removal from or during placing onto the conveyor 204.

The means which control the operation of the storing units 108A-108C exhibit the advantage that the number of blocks 116 in each row which is lifted off the conveyor 204 is not dependent on the width of gaps between neighboring blocks and/or on the speed at which the blocks are transported by the conveyor 204. This also reduces the likelihood of damage to blocks and their constituents because the magazines cannot receive and store rows of blocks whose length exceeds the maximum permissible length.

FIGS. 1 and 2 show that the storing units 108A-108C are located close to the respective packing machines 109A-109C. This is desirable in order to reduce the space requirements of the apparatus. However, such mounting of storing units close to the respective packing machines renders it necessary to activate a storing unit practically immediately after stoppage of the associated packing machine because the path portion between the storing unit and the packing machine is relatively short and cannot accommodate a substantial number of blocks 116. As described above, the control means of the apparatus are constructed and assembled in such a way that a storing unit begins to accept blocks immediately after stoppage of the associated packing machine. It has been found that it is more economical to utilize relatively large storing units than to provide room for storage of large quantities of blocks 116 between relatively small storing units and the respective packing machines.

The feature that the space between the stops S2 and S3 can store a certain number of blocks 116 (four in the embodiment of FIGS. 1-9) but that such number is a fraction of the number of blocks which must be placed end-to-end in order to fill the conveyor portion in a magazine 207 also contributes to compactness of the storing units and of the entire apparatus. This will be readily appreciated since the storing units would have to be installed far downstream of the prorating unit 107 if the stop S2 were designed to accumulate large numbers of blocks.

Each storing unit can comprise a single magazine. It has been found, however, that the provision of two or more magazines in each storing unit and the provision of means for filling each magazine independently of the other magazine or magazines contributes to reliability of operation of the apparatus because the filling of a relatively long single magazine would necessitate lengthy interruptions in delivery of blocks to the respective packing machine. Thus, and referring to FIG. 5, if the magazines 207a-207c were replaced with a single magazine having a length matching the combined length of magazines 207a-207c, the single stop S1 and the stops S2, S3 would be required to accumulate a very long row or set of blocks prior to transfer of such row of blocks into the single magazine.

It is further possible to provide gaps between successive magazines of a storing unit. The illustrated construction is preferred at this time because it is more compact and the neighboring frames 208a, 208b, 208c reinforce each other to form a sturdy housing for the magazines 207a-207c.

FIG. 10 shows a modified prorating unit 307. All such component parts of the unit 307 which are identical with or clearly analogous to corresponding component parts of the unit 107 are designated by similar reference characters plus 200. The prorating unit 307 comprises shifting devices 321B and 323B which can transfer blocks from the median path B, i.e., this unit operates in a manner as described in connection with FIG. 4. In other words, when the packing machine normally receiving wrapped blocks from the conveyor which defines the median path B is arrested, the blocks which arrive into the path B are transferred into the outer paths A and C. To allow for such mode of operation, the prorating unit 307 comprises arresting and intercepting devices corresponding to those shown in FIG. 4 (but not shown in FIG. 10). The unit 307 further comprises a switching device 352 having two pivotable sections or tracks 352A and 352C. The section 352A can be pivoted between the solid-line position and the broken-line position 352A' so that it can direct blocks from the path A into the path B (when in the position 352A'). Analogously, the section 352C is pivotable from the solid-line position (in which it allows the blocks to advance along the path C) to the phantom-line position 352C' in which the blocks arriving along the path C are caused to enter the path B.

If the packing machine which receives blocks from the conveyor defining the path A of FIG. 10 is out of commission, the section 352A of the switching device 351 is moved to the position 352A' so that the blocks leave the path A and enter the path B. If the packing machine normally receiving blocks from the conveyor which defines the path B is idle, the sections 352A, 352C of the switching device 351 remain in the solid-line positions but the prorating unit 307 operates in a manner as described in connection with FIG. 4, i.e., the blocks which arrive along the path B are transferred into the paths A and C. If the packing machine which normally receives blocks from the conveyor defining the path C is idle, the section 352C of the switching device 351 is moved to the position 352C' to cause the transfer of blocks from the path C into the path B.

The prorating unit can be modified in a number of additional ways without departing from the spirit of the invention. For example, the prorating unit may comprise a single shifting device which is capable of transferring a first series of blocks from the path B into the path A, the next (second) series of blocks from the path B into the path C, the next (third) series of blocks from the path B into the path A, and so forth. The just described modified prorating unit further comprises means for insuring that the paths A and C develop spaces (such as the spaces 1117A, 1117C shown in FIG. 3) which receive blocks from the path B when the packing machine at the discharge end of the path B is idle. The single shifting device then performs a working stroke during movement in either direction, i.e., during transfer of blocks from the path B into the path A and during subsequent transfer of blocks from the path B into the path C.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the claims.

What is claimed is:

1. Apparatus for processing biscuits which issue from an oven, comprising a plurality of conveyor means for transporting discrete rows of biscuits from the oven along a plurality of separate paths; means for accumulating the biscuits into a series of blocks in a first portion of each of said paths; a plurality of variable-output packing machines, one of each of said accumulating means and each disposed in a second portion of the respective path, said machines including devices for confining blocks of the respective series in containers; means for prorating the blocks of said series in third portions of said paths intermediate said first and second portions, including means for transferring equal numbers of blocks from one of said paths into each of the other paths in response to a reduction of the output of the machine in the second portion of said one path; and control means including means for increasing the output of the machines in the second portions of said other paths in response to transfer of blocks from said one path into said other paths.

2. Apparatus as defined in claim 1, wherein said conveyor means define three discrete paths.

3. Apparatus as defined in claim 1, further comprising discrete wrapping means disposed in fourth portions of said paths intermediate the respective first and third portions, each of said wrapping means including means for applying envelopes around successive blocks in the respective path.

4. Apparatus as defined in claim 1, wherein said prorating means further includes means for temporarily arresting the blocks in each of said paths so as to effect a pileup of blocks behind the arrested blocks and the development of spaces in front of the resulting piles of blocks, and means for intercepting the piles of blocks in said one path in register with the space in one other path, said transferring means including means for shifting the piles of blocks from said one path into the registering space in said one other path.

5. Apparatus as defined in claim 4, wherein said shifting means including means for moving all blocks from said one path into a first one of said other paths and for moving blocks from said first other path into a second other path.

6. Apparatus as defined in claim 1, further comprising means for temporarily storing blocks adjacent to each of said paths intermediate said prorating means and the respective packing machines.

7. Apparatus as defined in claim 6, wherein at least one of said storing means comprises a plurality of discrete magazines and means for independently transferring blocks from the respective path into each of said magazines and vice versa.

8. Apparatus as defined in claim 7, wherein said conveyor means comprises a continuous conveyor extending along all magazines of said one storing means.

9. Apparatus as defined in claim 7, wherein each of said magazines comprises means for storing elongated rows of blocks.

10. Apparatus as defined in claim 8, wherein the blocks which advance along said paths are normally separated from each other by gaps and further comprising control means for said transferring means including first blocking devices, one in each of said magazines and each movable into and from the respective path to respectively arrest and permit the passage of oncoming blocks, a second blocking device located ahead of said magazines and movable into and from the respective path to respectively intercept and permit the passage of oncoming blocks, means for monitoring the width of said gaps ahead of said second blocking device, signal generating means for monitoring the number of blocks which are intercepted by said second blocking device, a third blocking device located ahead of said second blocking device and movable into and from arresting engagement with the oncoming blocks, and means for respectively withdrawing said second blocking device from the respective path and moving said third blocking device into engagement with an oncoming block in response to a signal transmitted by said last mentioned monitoring means and denoting the interception of a predetermined number of blocks by said second blocking device whereby said second blocking device permits the intercepted blocks to enter one of said magazines and to be intercepted by one of said first blocking devices while said third blocking device prevents the blocks from advancing toward said second blocking device.

11. Apparatus as defined in claim 10, wherein said first mentioned monitoring means includes means for generating signals denoting gaps of predetermined width and said control means further comprises means for monitoring the extent to which said magazines are filled with blocks.

12. Apparatus as defined in claim 11, wherein said control means further comprises means for monitoring the respective path ahead of each of said first blocking devices for the presence of gaps and means for moving said first blocking devices into the respective path on detection of gaps by the corresponding last mentioned monitoring means.

13. Apparatus as defined in claim 10, wherein said control means further comprises means for monitoring the respective path for the presence of gaps in the region of said second blocking device and for actuating said means for moving said second blocking device into the respective path on detection of a gap in said region.

14. Apparatus as defined in claim 10, wherein said second and third blocking devices are spaced apart from each other, as considered in the longitudinal direction of the respective path, the distance between said second and third blocking device being a multiple of the length of a block but a fraction of the combined length of said magazines, as considered in the longitudinal direction of the respective path.

15. Apparatus as defined in claim 10, wherein said third blocking device comprises a pair of grippers disposed opposite each other at the opposite sides of the respective path, said means for moving said third blocking device comprising means for moving at least one of said grippers toward the other of said grippers.

16. Apparatus as defined in claim 10, wherein said first mentioned monitoring means is located ahead of said third blocking device, as considered in the direction of transport of blocks along the respective path.

17. Apparatus as defined in claim 10, wherein said magazines are disposed one behind the other, as considered in the direction of transport of blocks along the respective path, said transferring means including means for introducing blocks into and for withdrawing blocks from said magazines in a predetermined sequence.

18. Apparatus as defined in claim 17, wherein said magazines include a foremost magazine and said second and third blocking devices are located ahead of said foremost magazine, as considered in said direction.

19. Apparatus as defined in claim 17, wherein said first blocking devices are located at the downstream ends of the respective magazine, as considered in said direction.

20. Apparatus as defined in claim 10, wherein said control means further includes means for monitoring each of said magazines for the presence or absence of blocks therein.

21. Apparatus as defined in claim 10, wherein each of said first and second blocking devices comprises a bifurcated stop having upwardly extending arms disposed at the opposite sides of the respective path.

22. Apparatus as defined in claim 6, wherein at least one of said storing means comprises a magazine including two endless flexible conveyors disposed at the opposite sides of the respective path and having reaches extending upwardly from such path, said conveyors having supports for blocks and further comprising means for moving said conveyors in synchronism with each other so as to move said supports upwardly whereby the supports lift blocks from the path portion between said conveyors and downwardly whereby the supports deposit blocks into said path portion.

23. Apparatus for processing biscuits of predetermined width as defined in claim 22, wherein said conveyor means includes an elongated conveyor which defines the path between the conveyors of said magazine and has a width less than said predetermined width so that the blocks of biscuits thereon extend laterally therebeyond, said supports being arranged to engage those portions of blocks of biscuits which extend laterally beyond said elongated conveyor.

24. Apparatus as defined in claim 23, wherein said supports are substantially horizontal platforms and each platform of one conveyor of said magazine is coplanar with a platform of the other conveyor of said magazine in the region above the respective path.

25. Apparatus as defined in claim 22, wherein each conveyor of said magazine comprises a plurality of spaced-apart endless belts.

26. Apparatus as defined in claim 6, wherein said conveyor means includes continuously driven endless conveyors defining said paths.

* * * * *